United States Patent [19]
Knowles

[11] Patent Number: 5,129,710
[45] Date of Patent: Jul. 14, 1992

[54] VEHICLE ROAD WHEEL MOUNTING

[75] Inventor: Arthur Knowles, 24 Carter Lane West, South Normanton, Derbyshire DE55 2DX, England

[73] Assignees: Arthur Knowles; Robert J. Knowles; Jean Tonks, South Normanton, England

[21] Appl. No.: 725,008

[22] Filed: Jul. 2, 1991

[30] Foreign Application Priority Data

Jul. 16, 1990 [GB] United Kingdom ............... 9015624

[51] Int. Cl.⁵ .................. B60B 27/00; B60R 25/00
[52] U.S. Cl. .................. 301/9 DH; 70/225; 70/260; 301/105 R; 301/111; 403/261; 403/316; 403/326; 411/353
[58] Field of Search .............. 70/225, 237, 258-260; 301/9 DH, 9 CN, 9 DN, 105 R, 111, 120; 403/326, 261, 316, 317; 411/352, 353, 517, 518, 520, 521

[56] References Cited

U.S. PATENT DOCUMENTS

| 1,627,202 | 5/1927 | Ragsdale | 301/9 CN |
|---|---|---|---|
| 2,513,032 | 6/1950 | Lewis | 301/9 DH |
| 3,391,954 | 7/1968 | Callahan | 411/517 X |
| 3,516,270 | 6/1970 | Dowell | 301/9 DH |
| 3,962,951 | 6/1976 | Schenk | 411/517 X |
| 4,354,711 | 10/1982 | Main | 301/9 CN |
| 4,798,548 | 1/1989 | Higby et al. | 411/518 X |

FOREIGN PATENT DOCUMENTS 650941 2/1929 France ............... 301/9 DH

Primary Examiner—Lloyd A. Gall
Attorney, Agent, or Firm—Abelman Frayne and Schwab

[57] ABSTRACT

A vehicle road wheel mounting arrangement including a wheel hub with a shoulder against which a wheel center can be secured by a plurality of screwthreaded studs and nuts and, so that the vehicle wheel cannot be stolen even if all the nuts are removed from the screwthreaded studs, the hub having a groove containing a retainer ring and structure for urging the retainer ring radially outwards to make captive the wheel center on the hub.

5 Claims, 2 Drawing Sheets

VEHICLE ROAD WHEEL MOUNTING

FIELD OF THE INVENTION

The invention relates to a vehicle road wheel mounting arrangement.

It is a particular problem that vehicle road wheels, especially the road wheels of commercial vehicles, are frequently stolen. Various types of wheel studs and nuts have been employed in an effort to combat the problem but none have been completely successful because individual wheel nuts can be undone or the studs can be broken by a determined gang of thieves. It is a further problem that if the wheel nuts work loose it is possible for a vehicle wheel to be lost whilst the vehicle is in motion with potentially very serious and possibly fatal results. The loss of a vehicle road wheel is not only likely to render the vehicle uncontrollable but the wheel itself is potentially lethal to other road users and to pedestrians.

The invention has for its object to provide a vehicle road wheel mounting which will at least alleviate these problems.

SUMMARY OF THE INVENTION

According to the invention, there is provided a vehicle road wheel mounting arrangement including a wheel hub with a shoulder against which a wheel center can be secured by a plurality of screwthreaded studs and nuts, the hub being provided with a circumferential groove containing a retainer ring and with means for urging the retainer ring radially outwards to make captive a wheel center positioned on the hub. The means for urging the retainer ring radially outwards may be constituted by a plurality of circumferentially spaced pegs provided with sloping ramp surfaces by which the retainer ring is urged radially outwards as the pegs are fully inserted into cavities in which they are located. The pegs may also be provided with detent surfaces which are arranged to prevent the complete withdrawal of said pegs from the cavities in which they are located. The hub will preferably be provided with at least one key operable device for retaining at least a part of the retainer ring in the position in which it makes the wheel center captive on said hub. Means will preferably be provided for preventing the retainer ring from rotating in its groove.

DESCRIPTION OF THE PREFERRED EMBODIMENT

Figure 1:
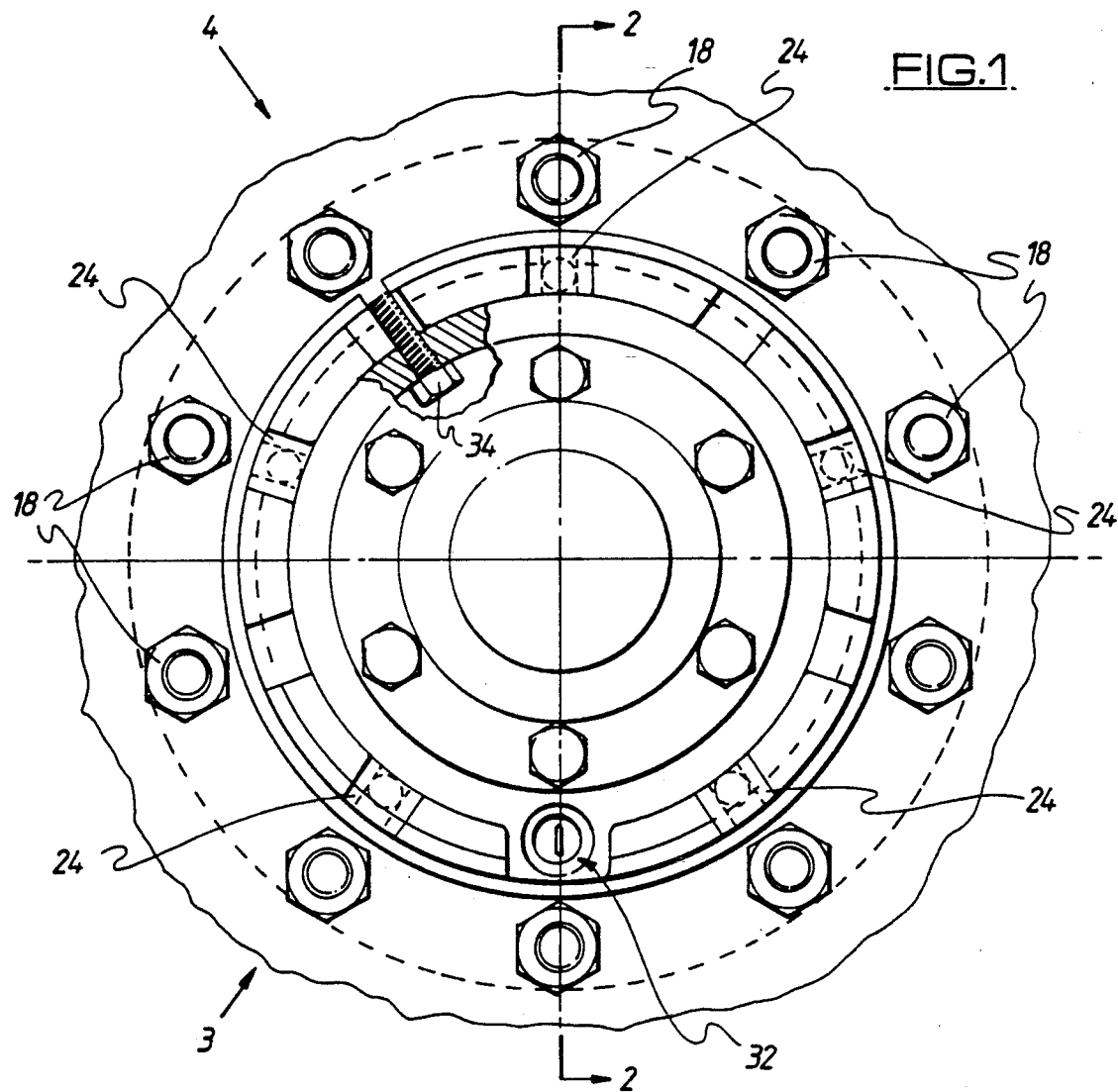
FIG. 1 is a side view of a wheel mounting arrangement embodying the invention.
Figure 3:
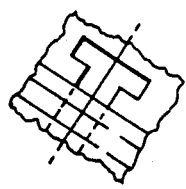
FIG. 3 is a view in the direction of arrow 3 in FIG. 1.

Referring now to the drawings, the road wheel mounting arrangement there illustrated is for a commercial road vehicle and includes a wheel hub 10 with a shoulder 12 against which a wheel center 14 (or in the case of the illustrated embodiment a pair of wheel centers for twin wheels) can be secured as shown. A plurality of screwthreaded studs 16 with respective nuts 18 are provided for securing the wheel center/s in position.

Figure 2:
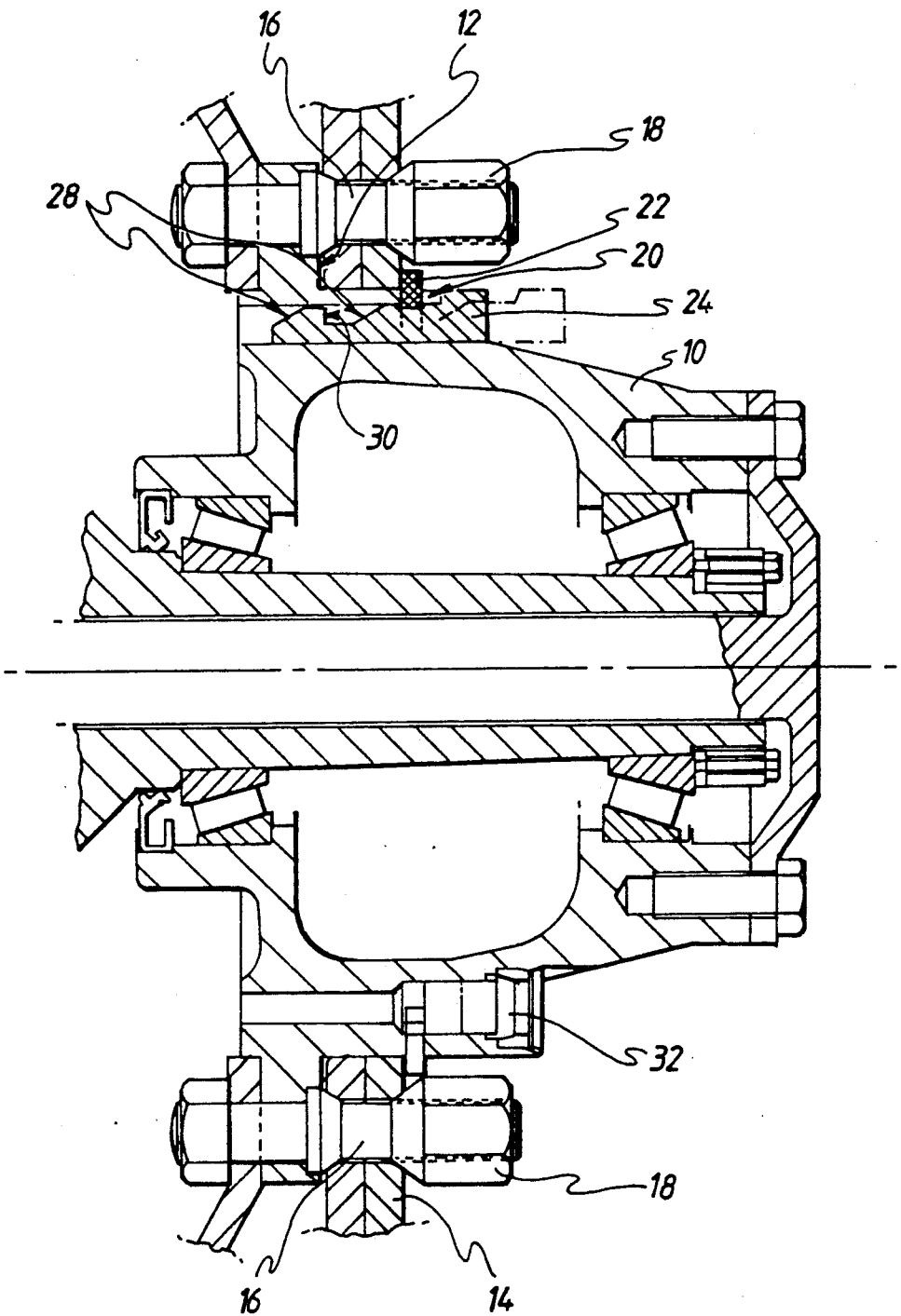
FIG. 2 is a sectional view on the line 2—2 in FIG. 1.

The wheel hub is provided with a circumferential groove 20 containing a retainer ring 22 and with means for urging the retainer ring radially outwards, to the position in which it is shown in FIG. 2, so that it makes captive the wheel center/s positioned on the hub. The means for urging the retainer ring radially outwards are constituted by a plurality of pegs 24 located in cavities in the hub, each peg being provided with spaced ramp surfaces 28 by which the retainer ring is urged radially outwards as the peg is fully inserted into the cavity in which it is located. In addition, the pegs are provided with detent surfaces 30 which are arranged to prevent the complete withdrawal of said pegs from the cavities in which they are located.

The hub is provided with a key operable device, generally indicated 32, for retaining at least a part of the retainer ring in the position in which it makes the wheel center/s captive on said hub independently of the pegs 24. The device 32 is in the nature of a rotatable peg arrangement with a 'flat' on one side, the device thus constituting a manually operable cam member which can only be operated by a key (not shown) in the manner of a door lock.

Figure 4:
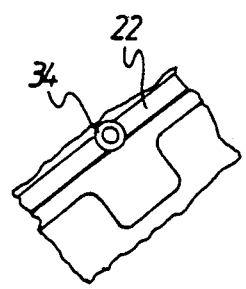
FIG. 4 is a view in the direction of arrow 4 in FIG. 1.

Referring in particular to FIGS. 1 and 4, means are provided for preventing the retainer ring 22 from rotating in its groove, these means being constituted by a set screw 34 which protrudes into the gap between the ends of the retainer ring.

The arrangement is such that when the owner of the vehicle concerned wishes to remove the road wheel(s), he can remove the set screw 34, can render the key operable device 32 inoperative, and can then withdraw each of the pegs 24 to the position shown in chain-dotted lines in FIG. 2 so that the retainer ring becomes retracted into its groove. The wheel center/s concerned can then be removed from the hub in normal manner. However, if a thief attempts to remove the road wheel/s from the hub, even if he partially withdraws each of the pegs 24, he still cannot operate the key operable device 32 and therefore cannot retract the retainer ring into its groove at that point. The wheel center is therefore still held captive on the wheel hub.

POSSIBLE MODIFICATIONS

Various modifications can be made. For example, the hub may have more than one key operable device 32 and in fact if the arrangement includes two or more (and preferably three or more) such devices the pegs 24 may not be required. Conversely, the key operable device may not be absolutely essential. For example, if the mounting is merely intended to alleviate the danger of a vehicle wheel being lost whilst the vehicle is in motion, the pegs 24 alone will achieve this. In other words, even though the wheel nuts may all have been lost the wheel center/s will not be able to become detached from the wheel hub. It is of course highly probable that the driver of the vehicle will detect the looseness of the wheel, particularly if the wheel concerned is a steerable wheel. Even if the loss of the wheel nuts is not detected on the move, their loss is likely to be discovered by visual observation during a halt. The mounting arrangement is therefore a very significant road safety feature whether or not it is also an antitheft device.

I claim:

1. A vehicle road wheel mounting arrangement including a wheel hub with a shoulder against which a wheel center can be secured by a plurality of screwthreaded studs and nuts, the hub being provided with a circumferential groove containing a retainer ring and with means for urging the retainer ring radially outwards to make captive a wheel center positioned on the hub in which the means for urging the retainer ring radially outwards are constituted by a plurality of circumferentially spaced pegs provided with sloping ramp surfaces by which the retainer ring is urged radially outwards as the pegs are fully inserted into cavities in which they are located.

2. A vehicle road wheel mounting arrangement according to claim 1, in which the means for pegs are provided with detent surfaces which are arranged to prevent the complete withdrawal of said pegs from the cavities in which they are located.

3. A vehicle road wheel mounting arrangement according to claim 1, in which the hub is provided with at least one key operable device for retaining at least a part of the retainer ring in a position in which it makes the wheel center captive on said hub.

4. A vehicle road wheel mounting arrangement according to claim 3, in which means are provided for preventing the retainer ring from rotating in its groove.

5. A vehicle road wheel mounting arrangement according to claim 4, in which the means provided for preventing the retainer ring from rotating in its groove are constituted by a screw which protrudes into a gap between ends of the retainer ring.

* * * * *